United States Patent Office 2,797,981
Patented July 2, 1957

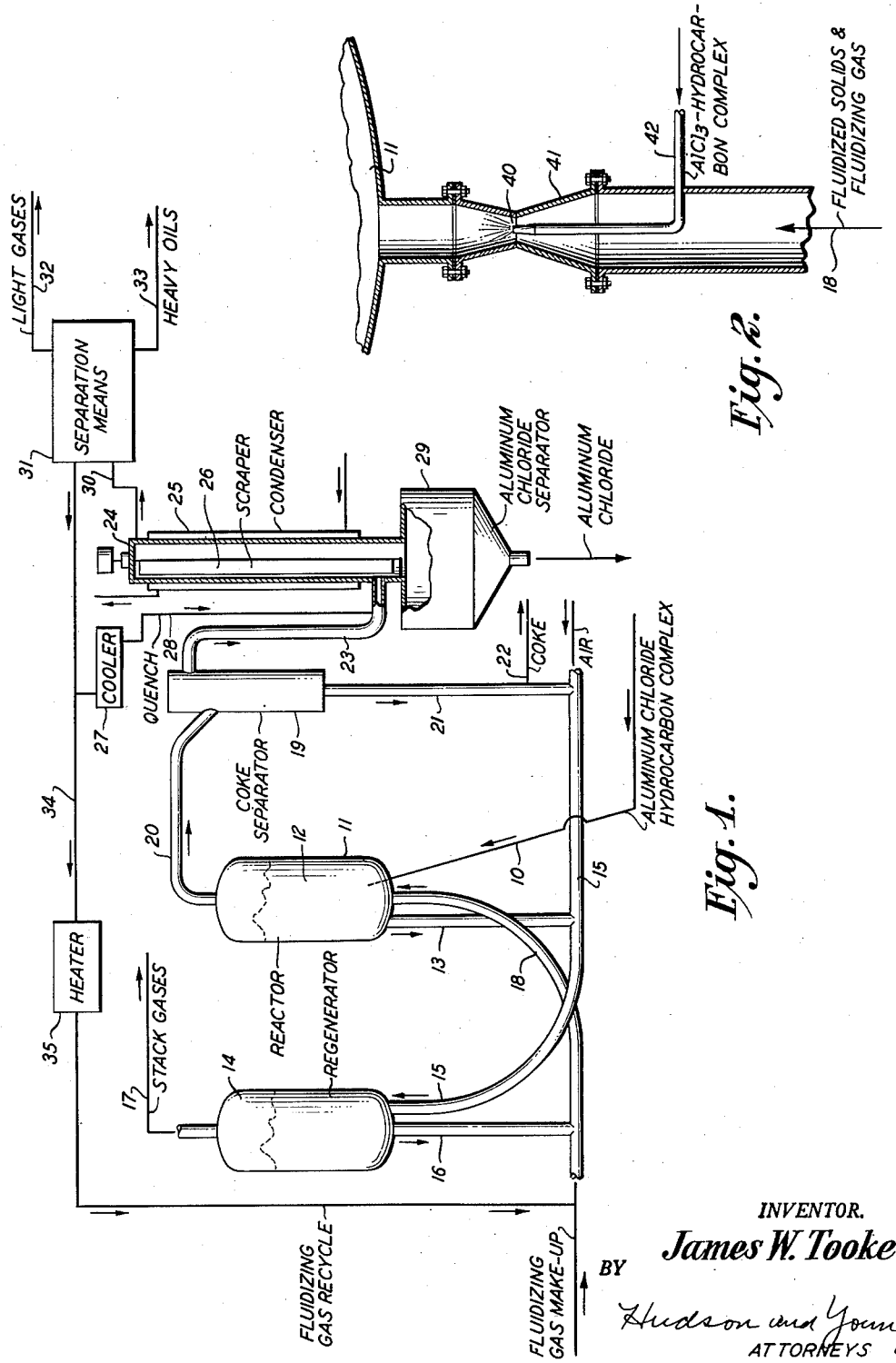

2,797,981

RECOVERY OF ALUMINUM CHLORIDE FROM A FLUID ALUMINUM CHLORIDE-HYDROCARBON COMPLEX

James W. Tooke, Bartlesville, Okla., assignor to Phillips Petroleum Company, a corporation of Delaware Application November 6, 1952, Serial No. 319,045

2 Claims. (Cl. 23—96)

This invention relates to the recovery of aluminum chloride from a fluid aluminum chloride-hydrocarbon complex. In one of its aspects, the method of the invention accomplishes the recovery of the aluminum halide from the fluid hydrocarbon complex employing procedural means by which the formation of a hard, carbonaceous residue requiring cracking and grinding is avoided. In another of its aspects, the invention recovers an aluminum halide from its fluid hydrocarbon complex in a manner such that the carbonaceous matter which is formed is obtained in a form such that its heat of combustion can be obtained, without crushing or grinding operations, to be used to obtain recovery of halide from additional quantities of halide-hydrocarbon complex.

In the present day practice of alkylation and isomerization, aluminum chloride is frequently used as a fluid aluminum chloride-hydrocarbon complex containing at least about 50 weight percent aluminum chloride. Generally, the catalyst is initially prepared by reacting anhydrous aluminum chloride with a paraffin hydrocarbon, or paraffinic hydrocarbon fraction, at a temperature between about 150–230° F. In the conversion of hydrocarbons with this catalyst, the catalytic activity is sometimes maintained by the gradual addition of aluminum chloride to the system to form more complex. In a continuous system, aluminum chloride per se is added continuously and an equilibrium complex is withdrawn at such a rate that the volume of the complex within the reaction zone remains constant. This equilibrium material so withdrawn contains aluminum chloride in substantially the same proportion as the catalytic material in the reaction zone and, in that form the aluminum chloride cannot be directly utilized in the same reactor. Such a liquid catalytic complex contains from about 50–55 to 65–70 weight percent aluminum chloride, of which about 35–45 percent is generally considered to be bound with hydrocarbon material and the remaining 5–25 percent thought to be free and dissolved and/or suspended in the complex.

The recovery of anhydrous aluminum chloride from such a fluid complex presents difficult problems. It is well known that the aluminum chloride-hydrocarbon complex may be decomposed by heat at a temperature in the range of about 700–1400° F. The products of the decomposition are aluminum chloride, coke, and a mixture of liquid and gaseous hydrocarbons. Approximately 60–80 weight percent of the aluminum chloride in the complex is evolved as gaseous aluminum chloride and the remaining 20–40 weight percent of the aluminum chloride is left in the coke. Upon the application of heat to the liquid complex, the aluminum chloride begins to vaporize therefrom prior to the formation of a hard residue or coke. The formation of the hard residue appears to be a time and temperature effect, and the amount of aluminum chloride recovered prior to the formation of this hard residue varies somewhat for individual complexes. The aluminum chloride remaining in the hard residue appears to be held through an adsorption process by the carbon in the residue. A carrier gas is helpful, therefore, in recovering the aluminum chloride from the hard residue.

In the usual process for the recovery of aluminum chloride, the fluid complex is charged to a retort or a similar apparatus and subjected to destructive distillation. After the aluminum chloride and some of the hydrocarbons distill out, the hard carbonaceous residue remains in the retort. The removal of this hard, carbonaceous residue from the vessel is a difficult, time consuming, and costly part of the aluminum chloride recovery operation. The formation of this hard, carbonaceous residue as a massive cake can be reduced to some extent by removal from the vessel of the viscous sludge resulting from the distillation of a portion of the aluminum chloride before the solid residue has formed.

According to the present invention, the destructive distillation of an aluminum chloride-hydrocarbon complex to recover aluminum chloride therefrom is carried out in a fluidized bed reactor maintained at a temperature in the range of a 700–1400° F. and pressure in the range of atmospheric to 100 p. s. i. g. In the practice of my invention, the fluid complex is continuously introduced into the reactor containing finely divided solid material, such as sand, which is maintained in a state of fluidity by vapors from the influent fluid catalytic material and a fluidizing gas. The vaporized aluminum chloride, hydrocarbon mixture, gas, and coke fines are continuously removed from the top of the reactor. The vaporized aluminum chloride is condensed, separated from the gas and hydrocarbon constituents, and recovered. The aluminum chloride may also be recovered by absorption in an aluminum chloride-hydrocarbon complex or in an inert liquid. The coky residue and/or coky sand particles are continuously removed from the bottom of the reactor and the carbonaceous material burned in a regenerator to provide the heat necessary to effect the decomposition of the aluminum chloride-hydrocarbon complex.

The term "fluidized" herein and in the claims is limited to those systems in which particulate material is suspended in a carrier gas or vapor and thereby "fluidized" enabling the transport of the "fluidized" particulate material, in said gas or vapor, as though the whole were a fluid. The fluidizing technique is well known in the art of hydrocarbon conversion. For example, it is known in said art to suspend a contact mass or catalyst, composed of finely subdivided solid particles, in a carrier gas or a hydrocarbon vapor and to convey the "fluidized" mass upwardly into a conversion zone or fluidized reactor bed composed of said particles and hydrocarbon vapor and, following a desired residence time of hydrocarbon and of particles to withdraw said particles from said bed at, say, the bottom of said zone and to remove converted vapors overhead. It is to the application of such a modus operandi to the recovery of aluminum halide that the claims are directed and limited.

In the process of my invention, the finely divided solid material is used as the fluidized medium. The decomposition reaction is carried out at an elevated temperature, and because of the characteristics of the fluidized bed, good heat transfer and temperature control are obtained. The finely divided material can be sand or any other inert solids, such as quartz, bauxite, or the coke or residue from the decomposition reaction itself. The material preferably should possess a high heat capacity and can contain a catalytic constituent to promote the decomposition reaction. When sand or other inert material is used as the fluidized medium, the carbonaceous material which accumulates on the particles must be burned off and thereby provides a readily available source of heat for the decomposition reaction. In the embodiment in which the coke formed by the decomposition reaction is used as the fluidizing medium, the surplus coke formed by the reaction is burned to supply the heat for decomposition. The use of a hot stream of fluidizing gas is necessary to fluidize the bed of fine particles and provides a means for transport of the fluidized material in the system. The gas may be a material such as nitrogen, methane, hydrogen, butane, or any gas not adversely reacting on or with the complex under the conditions of distillation. The volatile hydrocarbons recovered from the destructive distillation reaction can be employed as the fluidizing gas.

The use of the fluidized technique in the destructive distillation of aluminum chloride-hydrocarbon complex provides a means for intimate contact of the complex with the heat source to effect a fast, controlled decomposition reaction. Therefore, the coke formed by the decomposition reaction is in a finely divided form so that it can be readily removed from the decomposition vessel without the formation of a hard, massive cake. The coke is also recovered in a form in which it can be utilized as the fluidizing medium and as the source of heat for the decomposition reaction.

A preferred embodiment of my invention is now described in connection with Figure I in which a diagrammatic flow sheet is shown. The liquid aluminum chloride-hydrocarbon complex is supplied by line 10 to the reaction 11 containing a fluidized bed 12 of sand. The temperature in reactor 11 is maintained in the range of 700–1400° F. and preferably in the range of 900–1100° F. although somewhat higher or lower temperatures can be employed, if desired. It will be understood by those skilled in this art that the time spent in the reactor 11 by the complex will at any given temperature, within limits, control the amount of decomposition obtained and, therefore, the nature and quantity of deposited coke. The decomposition reaction occurs at a detectable rate at about 400° F. and becomes quite rapid at 600° F. Temperatures as high as 1800° F. have been used. The pressure is maintained in the range of atmospheric to about 100 p. s. i. g., but higher or even lower pressures can be employed. The liquid catalytic material contacts the particles of the fluidized bed in a finely atomized form obtained with a spray nozzle. The atomization of the liquid catalytic material may also be assisted by the use of a gas in a duplex, gas-assist type nozzle. The types and kinds of nozzles available in the art, properly adapted, are suitable to the formation of the spray of liquid catalytic material. An arrangement for creating a finely divided spray of the liquid catalytic material is shown in Figure II of the drawing in which aluminum chloride-hydrocarbon complex is fed by means of pipe 42 to the vena contracta 40 of a venturi tube 41 located in line 18 adjacent to reactor 11. Fluidized solids, forming the bed within the fluidized reactor 11, for example, and fluidizing gases pass through venturi 41 into reactor 11. The accumulated coke and/or carbon-coated solid particles are removed by line 13 from reactor 11 and are transported to regenerator 14 through line 15 by the stream of combustion air entering through line 15. The carbonaceous material is burned in regenerator 14 and the carbon-free sand particles are returned to reactor 11 by lines 16 and 18. The stack gases are discharged from regenerator 14 by line 17. The carbon-free sand particles are carried to reactor 14 by the fluidizing gas in line 18. The hydrocarbon gases recovered from the aluminum chloride-hydrocarbon complex decomposition are used as the said fluidizing gas.

The effluent from reactor 11 is a gaseous mixture of aluminum chloride and hydrocarbons, containing some solid coke, and is passed to coke separator 19 by line 20 without substantial reduction in temperature. Coke separation is preferably by cyclone separator but gravity separation or other separating means can also be used. The accumulated coke is removed by line 21 and is either burned in regenerator 14 by passage through line 15 or discharged as a by-product through line 22. The gases from coke separator 19, substantially free of coke, are passed through line 23 to be condensed in condenser 24 surrounded by a cooling jacket 25 and provided with a scraper 26. An initial lowering of the temperature may be effected by supplying quenching liquid such as condensed fluidizing gas, from cooler 27 through line 28 into line 23. Condenser 24 and separator 29 connected below it should be maintained at a temperature below 150° F. at which the vapor pressure of aluminum chloride is only a few millimeters of mercury. Scraper 26 is used to keep the deposits of solid material from building up on the inside walls of condenser 24 and to direct the solid aluminum chloride down into separator 29. Under these conditions the aluminum chloride will be substantially free from organic material, although at times it may contain 1–5 weight percent of such material. If desired, a solid aluminum chloride which contains too much contaminating material may be washed with a liquid, low-boiling paraffin hydrocarbon, such as liquid butane, to effect a further purification, in means not shown on the drawing.

The gaseous materials removed from the top of condenser 24 through line 30 comprise essentially hydrogen, propane, and isobutane with minor amounts of methane and isopentane produced by the decomposition reaction in reactor 11. The fluidizing gas, if the hydrocarbon gases formed in the decomposition reaction are not used as the fluidizing gas, will also be present in this gaseous stream. The separation of this gaseous stream to recover valuable constituents, to remove undesirable constituents from the fluidizing gas, and to recover the fluidizing gas is carried out in separating means 31. This separating means comprises fractional distillation columns and such associated equipment as may be necessary to effect a suitable separation. Light gases are discharged through line 32, heavier gases are discharged through line 33, and fluidizing gas is recycled to reactor 11 through line 34, heater 35, and line 18. The temperature of the fluidizing gas should be near, or above, the temperature in reactor 11.

In order to better show the relationship between the units of the process of my invention, a feed of 100 lbs. of liquid aluminum chloride-hydrocarbon complex to the reactor will be assumed. Approximately 10 cubic feet of gas is charged for each pound of catalytic material to maintain a linear gas velocity of from 2–5 feet per second in order to fluidize the bed of solids. In the reactor, the complex decomposes yielding 75 lbs. of vaporized material and 25 lbs. of solid residue. This vaporized material and the gas leave the top of the reactor and contains approximately 45 lbs. of aluminum chloride. The remainder of the vaporized material comprises principally light hydrocarbons, but also contains about 3.5 lbs. of hydrochloric acid and about 7 lbs. of heavy hydrocarbon oil. The 25 lbs. of coky residue comprises approximately 8 lbs. of aluminum chloride, possibly including some aluminum oxide, and 17 lbs. of carbonaceous material.

The rate of feed addition depends upon the size of the reactor, and in general, will be about ½ lb. of complex per hr. per square inch of cross-sectional area. A reactor to handle 1000 gallons per day of spent complex should be about 33 inches in diameter, 6–18 feet in height and would require about 100,000 cubic feet of fluidizing gas. Some of the equipment can be fabricated of inexpensive, corrosive resistant ceramic materials rather than high costly metal alloys but high nickel steels and alloys such as "Hastelloy B," "Inconel," and "Niresist" are also used.

The invention is applicable to the recovering of other halides from their complexes, for example, aluminum bromide.

Variation and modification are possible within the scope of the foregoing disclosure, drawing, and the appended claims to the invention, the essence of which is that an aluminum halide can be recovered cheaply and readily from a fluid complex of it and a hydrocarbon by employing a fluidized reactor procedure whereby the formation and, therefore, the crushing of hard coky residue masses is avoided and the heat of a portion of the coke can be and is recovered for use in the process while a further portion can be used as the fluidized solids in the reactor.

I claim:

1. A process for the recovery of an aluminum halide from a fluid aluminum halide-hydrocarbon complex which comprises spraying the said complex in finely divided form into a fluidized solids bed reaction zone maintained at an elevated temperature suitable for the decomposition of the said complex, maintaining the said complex in said zone for a controlled time sufficient to decompose the same to form aluminum chloride vapors and a finely divided carbonaceous residue deposited upon the fluidized solids in said zone, withdrawing aluminum chloride vapors from said zone and condensing the same as a product of the process, withdrawing fluidized solids having carbonaceous residue deposited thereon from said zone, and passing said solids to a regeneration zone, in said regeneration zone removing the carbon deposited upon said solids in said fluidized solids bed reaction zone thereby regenerating and reheating said particles for reuse in said fluidized solids bed reaction zone, returning said solids to said fluidized solids bed reaction zone for reuse, removing also hydrocarbon vapors from said fluidized solids reaction zone and recovering the same substantially free from aluminum chloride and then fluidizing said solids by employing by recycle the said hydrocarbon vapors as a fluidizing medium for the fluidization of said solids in said fluidized solids bed reacton zone.

2. A process according to claim 1 in which the solids in said fluidized solids bed reaction zone are selected from the group consisting of quartz, bauxite, sand, coke, residue from the decomposition reaction, and mixtures thereof.

References Cited in the file of this patent

UNITED STATES PATENTS

| | | |
|---|---|---|
| 1,835,279 | Carl | Dec. 8, 1931 |
| 2,485,050 | Hepp | Oct. 18, 1949 |
| 2,530,274 | Weber | Nov. 14, 1950 |
| 2,551,905 | Robinson | May 8, 1951 |
| 2,561,331 | Barker | July 24, 1951 |
| 2,577,591 | Sailors | Dec. 4, 1951 |
| 2,612,433 | Nicolai et al. | Sept. 30, 1952 |
| 2,630,413 | Weber | Mar. 3, 1953 |
| 2,639,215 | Bland | May 19, 1953 |
| 2,673,786 | Alleman | Mar. 30, 1954 |
| 2,701,181 | Kilpatrick | Feb. 1, 1955 |